Feb. 12, 1963   E. R. BRANDT   3,077,534
PHOTOFLASH UNIT
Filed June 23, 1958   2 Sheets-Sheet 1
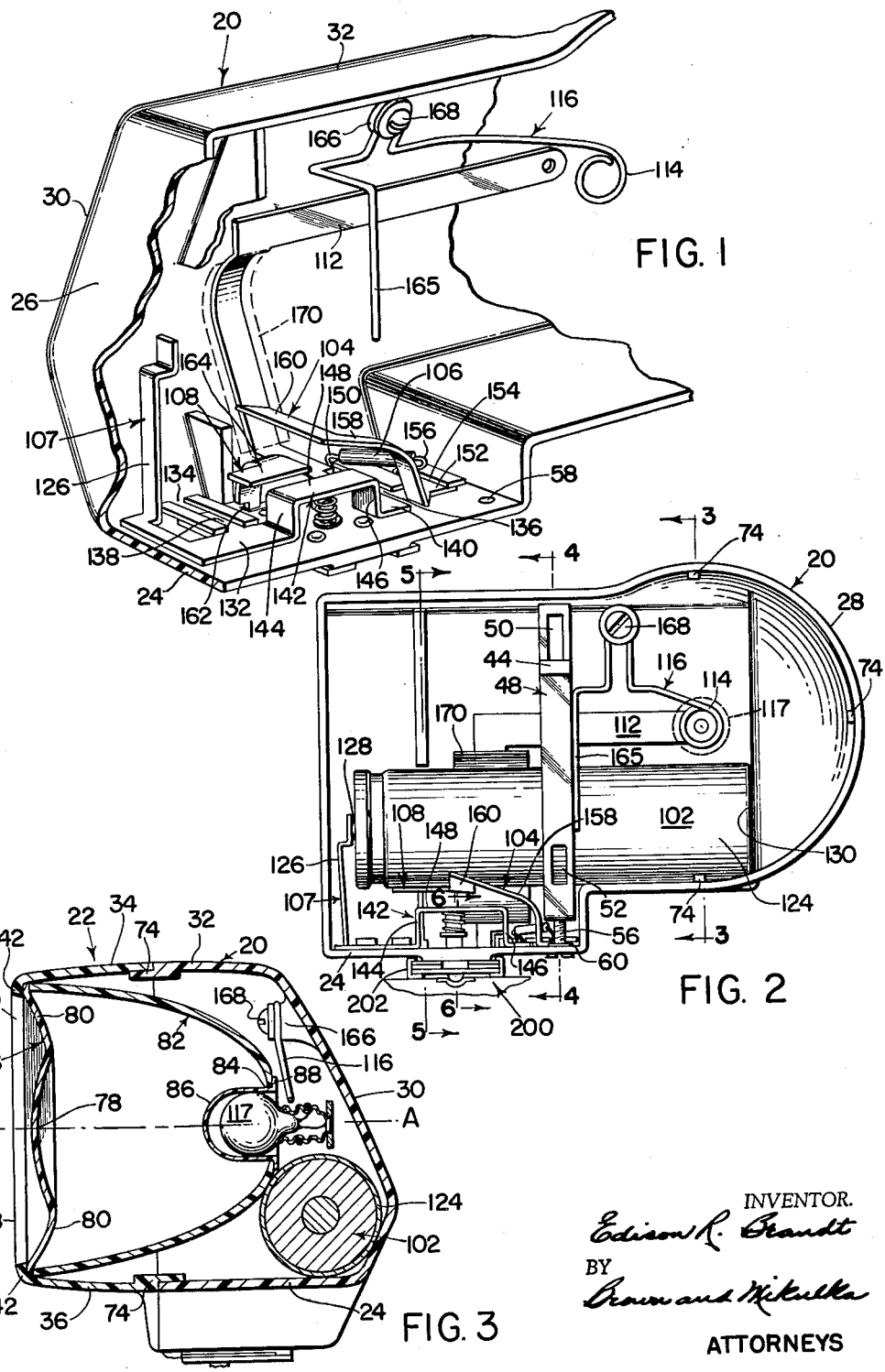
INVENTOR.
Edison R. Brandt
BY
ATTORNEYS

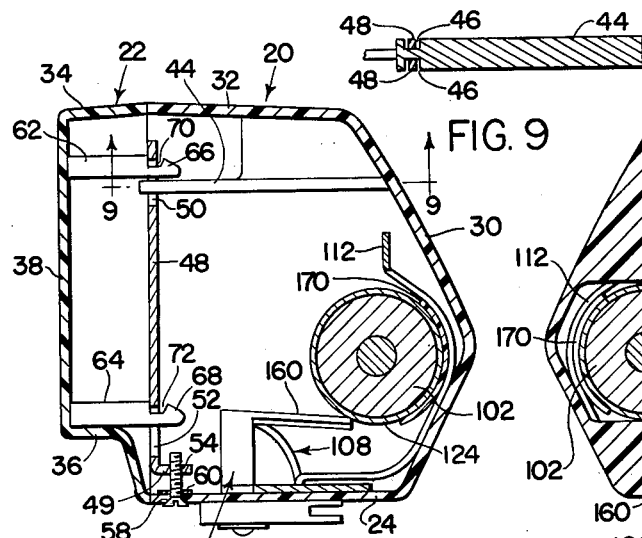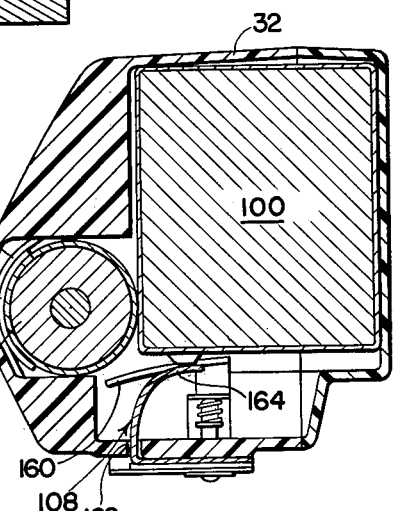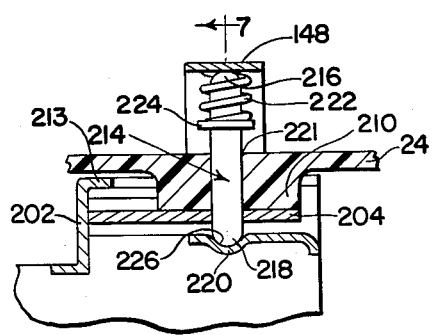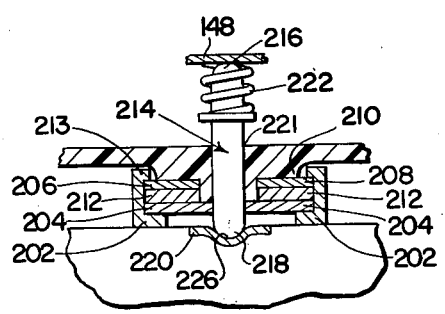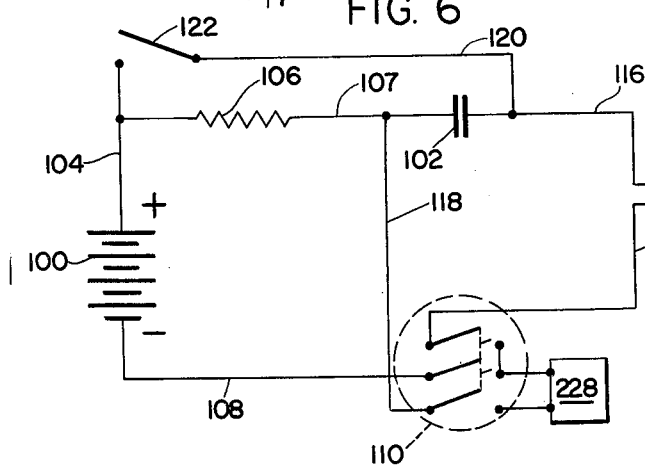

3,077,534
PHOTOFLASH UNIT
Edison R. Brandt, Marblehead, Mass., assignor to Polaroid Corporation, Cambridge, Mass., a corporation of Delaware
Filed June 23, 1958, Ser. No. 743,657
6 Claims. (Cl. 240—1.3)

This invention relates to photographic apparatus and more particularly to a device for obtaining flash illumination for photography, which device is an improvement over that shown in copending application Serial No. 743,658 filed June 23, 1958 by Robert C. Casselman et al. for Photoflash Unit.

A principal object of the present invention is to provide an improved device for obtaining flash lighting of photographic intensity from an incandescent lamp bulb.

Other objects of the invention are to provide a simple, inexpensive flash lamp adapted for releasable mounting upon a camera and having a mounting means comprising a means for completing both a circuit for charging the capacitor of a battery-capacitance type flash unit and a circuit coupling said flash unit with a flash synchronizing switch in said camera; to provide in such a flash lamp a safety means for discharging said capacitor upon the removal of a battery; to provide in such a flash lamp a means for releasably locking housing portions in a fixed relation to form an integral unit; to provide in such a flash lamp resilient means which both releasably retain the electrical components of the unit in relatively fixed positions and also provide electrical coupling between said components; and to provide such a flash lamp which includes a light-reflecting means comprising a curved reflecting surface and two openings, a light-diffusing member disposed in one of said openings, and an optically transparent cover disposed over the other of said openings, said member and said cover being sealed to said openings to provide an integral unit.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a fragmentary perspective view of some of the elements of an embodiment of the invention enclosed in a rear housing portion with certain parts broken away;

FIG. 2 is a front elevational view of the embodiment of FIG. 1 showing additional elements including a battery, a condenser and an incandescent bulb indicated in dotted lines;

FIG. 3 is a sectional view taken along the line 3—3 of FIG. 2 and including a similar section of an attached front housing portion with a reflecting means shown in cross-section;

FIG. 4 is a sectional view taken along the line 4—4 of FIG. 2 without a battery, and including a similar section of an attached front housing portion;

FIG. 5 is a sectional view taken along the line 5—5 of FIG. 2 including a battery, and also including a similar section of an attached front housing portion;

FIG. 6 is an enlarged partial sectional view taken along the line 6—6 of FIG. 2, showing a fragment of the mounting foot of FIG. 2 and a fragment of a camera including a device upon which the flash unit may be mounted;

FIG. 7 is a sectional view taken along the line 7—7 of FIG. 6;

FIG. 8 is a schematic circuit diagram showing the electrical relationship of the various components of the device and an associated synchronizing switch; and FIG. 9 is a sectional view taken along the line 9—9 of FIG. 4.

In general, this invention relates to a compact, lightweight flash lamp of the type characterized as battery-capacitance lamps which may be detachably mounted by suitable mounting means upon a camera having a built-in flash-synchronizing means such as a shutter actuated discharge switch. The unit, in common with other flash units well known in the art, comprises an electrical power source such as a battery, an electrically capacitive element, and other electrical elements of a battery-capacitance flash circuit which may be operatively connected with said flash-synchronizing means. The flash unit, hereinafter disclosed in detail, in the preferred embodiment includes a light-producing source which comprises an incandescent lamp bulb in distinction to those flash guns which are designed for use with either gaseous discharge tubes or vaporizable filament bulbs. Consequently, an operator of this flash unit need not be concerned with the expense and inconvenience of replacement of an expended bulb with each exposure, nor face the disadvantage of the bulk and cost of a gaseous discharge type unit.

Referring now to the drawings, there is shown a flash unit comprising a housing having a rear portion 20 and a front portion 22. Rear portion 20 includes a substantially flat, two-level bottom wall 24, two upstanding side walls 26 and 28, an angular rear wall 30 and a top wall 32. Side wall 28 is preferably curved outwardly of the interior of rear portion 20 in order to provide a configuration into which a reflecting means may be inserted. Front portion 22 includes two upstanding side walls (not shown), a top wall 34 and a bottom wall 36, all so shaped as to be readily butted against the corresponding walls of the rear portion. Also included in front portion 22 is a front wall 38 having an opening 40 therein adjacent the curved side wall corresponding to side wall 28, opening 40 being preferably circular. As a means for retaining other elements of the device within front portion 22, opening 40 is provided, in the form shown, with a flange 42 disposed about the periphery thereof. The housing portions 20 and 22 may be formed of any suitable elecrical non-conductive or insulating material such as acrylic, phenolic and other resins and plastic materials, including vulcanized rubber.

As a means for releasably locking front portion 22 to rear portion 24 there is shown in FIGS. 2 and 4 a simple engaging device which comprises an upstanding mount 44 disposed in rear portion 24 approximately midway between side walls 26 and 28 upon rear wall 30, mount 44 extending forwardly from rear wall 30 and approximately parallel with top wall 32 to a point just beyond the forward margin of top wall 32. Disposed on upstanding mount 44 by suitable means such as transverse channels 46 disposed in the upstanding mount as shown in FIG. 9, is a slidable locking member as, for instance, slide 48. Slide 48 preferably comprises an elongated flat member having a long dimension which is substantially less than the distance from top wall 32 to bottom wall 24. Slide 48 includes a turned-down portion 49 at one extremity thereof, and in the form shown, includes two openings 50 and 52, opening 50 being so dimensioned as to be slidably engageable in channels 46 for mounting the slide on the upstanding mount. Slide 48 is so disposed on upstanding mount 44 that turned-down portion 49 is located adjacent bottom wall 24. As a means for moving slide 48, turned-down portion 49 includes an opening therein such as threaded hole 54 which is adapted to receive an axially rotatable threaded lock screw 56. Screw 56 preferably extends through an opening 58 in bottom wall 24 and into engagement with threaded hole 54, being retained in its position in opening 58 by means such as washer 60. Screw 56 is preferably of the "coin slotted" type, thus providing for easy movement of slide 48 by an operator.

As shown in FIG. 4, front portion 22 is provided with means such as locking lugs 62 and 64 for releasably locking front portion 20 to rear portion 22. Lugs 62 and 64 comprise upstanding members disposed approximately midway between the side walls of front portion 20 and extending approximately perpendicularly from front wall 38 in a rearward direction respectively adjacent top wall 34 and bottom wall 36. Each of the lugs is provided respectively with a bevelled end 66 and 68 and a transverse slot 70 and 72 respectively adjacent each respective bevelled end. Each of lugs 62 and 64 is so dimensioned as to fit snugly into openings 50 and 52 respectively in slide 48 such that movement of slide 48 along channels 46 engages the slide in slots 70 and 72. To aid in positioning front portion 22 in butted relationship with rear portion 20, both the rear portion and front portion are shown in FIGS. 2 and 3 provided with means such as studs 74 which are so affixed at various points to the side, top and bottom walls of both housing portions as to extend into contact with the interior of the corresponding wall of the opposite portion when the housing portions are joined. Of course, if desired, other constructions may be employed. For example, rear portion 20 could be provided with a flange running around the outer edge of the top, bottom and side walls against which the corresponding walls of the front portion could be butted.

Disposed in front portion 22 and providing an optically transparent protective cover over opening 40 is an element such as circular collimating lens 76 as seen in FIG. 3. Lens 76, in the form shown, comprises an element having a circular central portion 78 with a concave-convex cross section and an annular peripheral portion 80 surrounding the central portion, the center of curvature of the central portion being preferably located at a light source which is further defined herein. Lens 76 may be constructed of any suitable material such as glass, but is preferably composed of a clear hard plastic material such as methyl methacrylate to minimize the possibility of breakage. Other configurations may also be employed, one example being a substantially planar sheet of a suitable material.

Associated with front housing portion 22 is a reflecting means such as cup-shaped reflector 82, the largest diameter of which is preferably attached to lens 76 to form an integral unit therewith. Reflector 82 is shown as ellipsoidal and is provided with an aperture 84 adjacent its vertex. Other geometrical shapes, for example, semispherical or paraboloidal or the like, may be given to the reflector which may be made of metal or other conventional material and which preferably has its inner surface suitably coated or polished to provide a highly reflecting surface. Reflector 82 is preferably disposed with its axis of revolution A—A colinear with the optical axis of circular lens 76. Aperture 84 at the vertex of reflector 82 is, in the form shown, circular and substantially smaller in diameter than the diameter of lens 76. Disposed in aperture 84 and extending therethrough into the concavity of reflector 82 is a light-diffusing member such as a roughly semi-spherical nipple 86 which is preferably provided peripherally about its open end with means such as flange 88 for retaining nipple 86 and which may be affixed by, for instance, cement to reflector 82. Nipple 86 is preferably composed of an optically translucent diffusing substance such as frosted glass or an appropriate plastic. In the preferred embodiment, to preserve the interior cleanliness of and to prevent injury to the reflecting surface of reflector 82 and also to provide for the convenient removal of front housing portion 22 from rear housing portion 20, reflector 82, nipple 86, lens 76 and front portion 22 are all so sealed in fixed relation to one another as to comprise an integral unit which is preferably substantially moisture and dirt proof.

As previously indicated, the battery-capacitance circuit comprises battery 100, an electrically capacitive element such as condenser 102 and other electrical elements connected with a flash synchronizer switch associated with the shutter of the camera. The circuit, as shown in FIG. 8, comprises battery 100, the positive terminal of which is connected by a lead 104 through an electrical resistance such as resistor 106 and from resistor 106 by lead 107 to the positive plate of condenser 102. The negative side of the battery is connected by a lead 108 to a portion of a first switching means which is generally indicated by the reference numeral 110. Another portion of first switching means 110 is connected by lead 112 to one contact of a lamp bulb-holding means, such as bulb socket 114, while the other contact from the bulb socket is connected by a lead 116 to the negative plate of the condenser. Bulb socket 114 is shown having a bulb 117 disposed therein. It will thus be noted that first switching means 110, bulb socket 114, condenser 102, resistor 106 and battery 100 are all connected in series. Yet another portion of first switching means 110 is connected by means such as lead 118 to the positive plate of condenser 102. Additionally, there is a lead 120 for electrically coupling the negative side of condenser 102 through a second switching means 122 to the positive plate of battery 100.

As may be seen in the drawings and particularly in FIGS. 1 and 2, rear housing portion 20 provides a supporting enclosure for the elements comprising the battery-capacitance circuit. Disposed within housing portion 20 is condenser 102 which is preferably in the form of the well known electrolytic condenser for compactness and reliability and includes as a negative terminal, a metallic cover 124. As previously noted, the positive terminal of condenser 102 is connected by means such as lead 107 to resistor 106.

It may be seen that lead 107, in the form shown, comprises an electrically-conducting, resilient strip which is preferably composed of a metal such as steel or copper alloy. Lead 107 includes a spring portion 126 which is so biased as to provide a means for releasably retaining condenser 102 within rear housing portion 20 and to provide an electrical contact with positive terminal 128 of condenser 102. Condenser 102 is thus retained in a predetermined position within the rear housing portion between abutment portion 130 of the rear housing portion and spring portion 126 of lead 107. Lead 107 also includes a central portion 132 which is disposed along bottom wall 24 of rear housing portion 20 and from which spring portion 126 extends. As a means for securing central portion 132 to bottom wall 24, the bottom wall is provided with channels 134 and 136 which may be formed in bottom wall 24 as by cutting or by molding. Central portion 132 of lead 107 is provided with locking arms 138 and 140 appended thereto and which are adapted to engage channels 134 and 136 respectively for firmly retaining lead 107 in its operative position. Central portion 132 of lead 107 includes a bridging portion 142 which is approximately U-shaped and comprises two supporting leg portions 144 and 146 and a cross portion 148 joining said leg portions, cross portion 148 being preferably parallel to and displaced a predetermined distance from bottom wall 24 in order to provide clearance for a movable detent element to be hereinafter described. Electrically attached to locking arm 140 in channel 136, by means such as a portion 150 of lead 107, is one terminal of resistor 106.

Lead 104 preferably comprises an electrically conducting resilient strip of the same material as lead 107 and includes at one extremity an appending arm 152 which is slidably engaged in channel 154 approximately parallel with both bottom wall 24 and with arm 140 of lead 107. Attached to appending arm 152, by means such as portion 156 of lead 104, is the other terminal of resistor 106. Lead 104 also comprises a central portion 158 which preferably extends arcuately from bottom wall 24 to a first point adjacent and displaced from cross portion 148, lead 104 including a resilient contact portion 160 disposed at said first point.

Lead 108 extends from opening 162 in bottom wall 24 adjacent rear wall 30 forwardly and upwardly from bottom wall 24 to a second point adjacent and in approximately the same plane as contact portion 160 of lead 104, lead 108 including a contact element 164 disposed at the second point. Contact element 164 of lead 108 and contact portion 160 of lead 107 together provide a resilient mounting means upon which a power source such as battery 100 may be so resiliently mounted as to be releasably retained within rear housing portion 20 and also provide means for electrically coupling battery 100 with other elements of the circuit. As a safety switching means for discharging condenser 102 upon removal of battery 100, the contact portion of lead 107 is preferably shaped to so extend at an angle from central portion 158 toward rear wall 30 as to be resiliently engageable with metallic cover 124 of condenser 102.

As a means for coupling condenser 102 with bulb 117, lead 116, in the form shown, comprises an elongated member such as a wire, one end 165 of which is in resilient contact with cover 124 of the condenser. As a means for holding wire 116 in contact with condenser 102, there is provided on rear wall 30 of rear housing portion 20 an upstanding portion 166 into which fastening means such as screw and washer 168 may be affixed. The other extremity of lead 116 is, in the form shown, shaped to present a bulb socket 114 having a circular configuration into which the base of a miniature bulb 117 may be screwed. Socket 114 is preferably disposed to abut opening 84 at the vertex of the reflector when the front housing portion 22 and its associated reflecting elements are butted in operative position against rear housing portion 20. The circular configuration of lead 116 consequently provides a resilient mounting means for the bulb as well as providing one electrical contact coupling the condenser and the bulb. It should be noted that other forms of means for mounting bulb 117 may be provided, as for instance, a standard bulb socket. Additionally, lead 116 may be provided in the form of a metallic strip similar to those leads previously described herein. However, the preferred form is particularly desirable from the standpoint of cost, simplicity and ready adjustability.

Lead 112, which couples the other electrical contact of bulb 117 with second switching means 110, preferably is in the form of an electrically conducting metallic strip which is so mounted along rear wall 30 of rear housing portion 20 as to provide a resilient electrical contact against the base of bulb 117, lead 112 being shaped to follow the inner contour of rear wall 30 between the rear wall and condenser 102, being separated from condenser 102 by insulating means such as insulating strip 170. Lead 112 extends downwardly along rear wall 30 and into opening 162 in bottom wall 24 of rear housing portion 20.

It should be noted that, as a light-producing source, there has been provided, in the form shown, bulb 117 which is preferably of the miniature incandescent type. For example, where a G–4½, 0.25 amp., 12 volt bulb is employed, other elements of the circuit have typical values as follows: condenser 102, 900 mfd.±20% measured at 10 cycles, 50 W.V.D.C. electrolytic; resistor 106, 1000 ohms, 0.5 watt; and battery 100, 45 volts. Bulb 117 is so disposed in the configuration of socket 114 that when all of the electrical elements are in operative position, the bulb is approximately centered inside nipple 86.

However, by so utilizing an incandescent bulb, reflector 82 and associated lens 76 and nipple 86 may be made integral with front housing portion 22, there being no need for frequent bulb replacement. Additionally, as the diffusing element may be thus located inside the reflector adjacent its focal point, a sharp beam of diffused light may be obtained. The flash unit disclosed herein may employ a standard vaporizable lamp such as the M2 type with minor modifications of the bulb socket.

It should be noted that the various leads provided for joining the electrical elements of the circuit have been described as metallic strips which, for the most part, are operatively mounted upon the various walls of rear housing portion 20 by slidable engagement in channels disposed at predetermined locations within the rear housing portion. Other means for mounting the leads, such as cement or rivets, may of course be employed. The preferred means for mounting the leads, however, has the advantages of simplicity in construction and of facilitating assembly of the various components while permitting maximum utilization of the resiliency of the leads for retaining the various elements in their operative positions.

Means are provided for mounting the invention on a camera and for electrically connecting the battery-capacitance circuit of the invention with the synchronizer switch associated with the shutter of the camera. In the form shown, particularly in FIGS. 6 and 7, this means comprises a flanged foot generally indicated at 200 and adapted to be engaged by a clip 202 shown on a fragment of the camera. Foot 200 comprises a U-shaped foot plate 204 and twin connectors 206 and 208. Connectors 206 and 208 respectively comprise portions of lead 108 and lead 112 which extend through opening 162 in bottom wall 24 and are so secured to raised portion 210 exteriorly of bottom wall 24 as to lie approximately parallel with bottom wall 24 and in the same plane with one another without contact with each other. Disposed between plate 204 and connectors 206 and 208 is a U-shaped sheet 212 of electrically insulating material. The connectors, the sheet and the plate are so formed that their edges extend beyond raised portion 210 to permit foot 200 to be engaged by electrically conducting retaining flanges 213 on clip 212 on the camera.

As a means for releasably securing the invention to the camera, there is preferably provided a movable detent plunger 214 comprising a flanged pin having rounded ends 216 and 218, end 218 being adapted to contact and engage detent contact 220 on the camera. Plunger 214 extends through a hole 221 formed in the bottom wall 24 and between connectors 206 and 208 and the arm portions of U-shaped plate 204. Plunger 214 is, in the form shown, biased toward detent contact 220 by resilient means such as spring 222 which also provides an electrical connection between cross portion 148 of lead 107 and detent contact 220. As a means for retaining the plunger in hole 221 despite bias of spring 222, plunger 214 is provided with a circumferential flange 224 disposed at a predetermined position between ends 216 and 218, the flange also providing an abutment against which spring 222 may exert its bias. It may be seen that flange 224 has a cross-sectional diameter substantially greater than the diameter of hole 221 to prevent movement of the plunger outwardly from the rear housing portion through hole 221. Detent contact 220 is also provided with a means such as depressed portion 226 adapted to engage end 218 of plunger 214 when the flash unit is mounted upon the camera, thereby releasably retaining the unit in a fixed relation to the camera.

Clip 202 and detent contact 220 comprise individual electrical contacts which lead to a shutter synchronizing switch designated generally by the reference numeral 228 in FIG. 8 and included within the camera shutter mechanism. An example of such a clip and detent contact may be seen in the Model 80 series type of camera sold by Polaroid Corporation and also shown in detail in U.S. Patent No. 2,812,420.

In operation, the flash unit may be mounted upon the camera by insertion of flanged foot 200 into clip 202 on the camera. The engagement of foot 200 with clip 202 causes plunger 214 to move axially against the bias of spring 222 until the plunger is so positioned with respect to detent contact 220 as to engage depressed portion 226 thereof. Foot 200, clip 202, plunger 214 and detent contact 220 together comprise a means which may be characterized essentially as a three-pole, single-throw switch and which is shown diagrammatically in FIG. 8. As a consequence of the engagement of plunger 214 with detent contact 220 and of clip 202 with connector 206 of foot 200, synchronizing switch 228 of the camera has now been introduced to complete a firing circuit which comprises the synchronizing switch, the condenser 102 and the bulb 117. As a consequence of the engagement of connector 208, connector 206 and clip 202, clip 202 acts as a switch closure by short circuiting the connectors and thus completing a charging circuit comprising battery 100, resistor 106, condenser 102 and bulb 117. As may be seen, therefore, condenser 102 remains uncharged until the unit is mounted upon the camera. Further, because connector 206 and connector 208 are, on the whole, not exposed, but are protected by their disposition between bottom wall 24 and insulating sheet 212, and further protected by U-shaped foot plate 204, the placement of the unit upon a conducting surface will not accidentally discharge the condenser.

Actuation of synchronizing switch 228 by the operation of the shutter mechanism of the camera releases the charge on condenser 102 through incandescent bulb 117, thereby causing a flash of light. Opening of the synchronizing switch consequent on the operation of the shutter mechanism of the camera permits a new charge to be built up in condenser 102 and the unit is ready for another firing. With a suitable choice of values of the components, an optimum time delay before flash and an optimum flash duration may be established.

It should be noted that when battery 100 is in its operative position wherein the terminals of the battery are in contact with leads 108 and 104, the leads are depressed, as shown particularly in FIG. 5, to a tensioned position wherein they releasably retain the battery within the rear housing portion by urging the battery into contact with top wall 32. The removal of the battery in order to, for instance, replace a bulb or other component, allows lead 104 to resiliently spring into contact, as shown particularly in FIG. 4, with a metallic cover 124 of condenser 102. Essentially the movement of lead 104 functions as the closure of switch 122, as is shown in FIG. 8. The closure of switch 122 results in the discharge of condenser 102 through resistor 106, thereby obviating the possibility of injury or shock to the operator through the accidental touching of the condenser.

The foregoing construction and arrangement of elements results in the provision of a self-contained photoflash unit adapted to be detachably mounted upon a camera with great facility and which, when mounted on a camera, results in closure of the charging circuit within the photoflash unit, and in connection with switch means associated with the shutter mechanism of the camera for completing a firing circuit for firing the lamp in synchronism with a photographic exposure. The unit is characterized by an efficient, compact construction having a minimum number of parts, ease of assembly and attractive appearance made possible by the use of a reflector mounted within a casing and the relatively small size of the entire unit.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photoflash unit for use with a camera and comprising, in combination, a hollow housing means comprising a first housing portion and a second housing portion movably separable from one another for providing access to the interior thereof, said first housing portion including an opening therein, an integral reflecting unit including a conoidal reflector, light-transmitting means mounted for fully closing said reflector, a light-diffusing element having a portion thereof extending interiorly of said reflector adjacent the vertex thereof, said reflecting unit being affixed interiorly of said first housing portion with said light-transmitting means in covering relation to said opening, one of said housing portions including an upstanding element mounted interiorly thereof, and an elongated member slidably engaged with said upstanding element for movement approximately perpendicular thereto, said elongated member having at least one opening therein, and means for moving said elongated member, the other of said housing portions including means affixed interiorly thereof and so engageable with said opening in said elongated member that movement of said elongated member in one direction retains said housing portions in predetermined relation to one another, and that movement of said elongated member in an opposite direction releases said housing portions from said predetermined relation.

2. A photoflash unit for use with a camera and comprising, in combination, a hollow housing means comprising a first housing portion and a second housing portion movably separable from one another for providing access to the interior thereof, said first housing portion including an opening therein, an integral reflecting unit including a conoidal reflector, light-transmitting means mounted for fully closing said reflector, a light-diffusing element having a portion thereof extending interiorly of said reflector adjacent the vertex thereof, said unit being affixed interiorly of said first housing portion with said light-transmitting means in covering relation to said opening, one of said housing portions including an upstanding element mounted interiorly thereof and an elongated member slidably engaged with said upstanding element for movement approximately perpendicularly thereto, said upstanding element having transverse channels therein, said elongated member comprising a substantially flat member including two openings therein and a turned-down portion at one extremity thereof, one of said openings being so dimensioned as to be slidably engageable in said channels, said turned-down portion including a threaded hole therein, said one of said housing portions including an aperture therein disposed adjacent said turned-down portion, and a threaded screw disposed in said aperture and in engagement with said threaded hole for moving said elongated member, the other of said housing portions including means affixed interiorly thereof and so engageable with said opening in said elongated member that movement of said elongated member in one direction retains said housing portions in said predetermined relation to one another, and that movement of said elongated member in an opposite direction releases said housing portions from said predetermined relation.

3. A photoflash unit for use with a camera and comprising, in combination, a hollow housing means comprising a first housing portion and a second housing portion movably separable from one another for providing access to the interior thereof, one of said housing portions including an upstanding element mounted interiorly thereof, and an elongated member slidably engaged with said upstanding element for movement approximately perpendicular thereto, said elongated member having at least one opening therein, and means for moving said elongated member, the other of said housing portions including means affixed interiorly thereof and so engageable with said opening in said elongated member that movement of said elongated member in one direction retains said housing portions in predetermined relation to one another, and that movement of said elongated member in an opposite direction releases said housing portions from said predetermined relation.

4. A photoflash unit for use with a camera and comprising, in combination, a hollow housing means comprising a first housing portion and a second housing portion movably separable from one another for providing access to the interior thereof, one of said housing portions including an upstanding element mounted interiorly thereof and an elongated member slidably engaged with said upstanding element for movement approximately perpendicular thereto, said upstanding element having transverse channels therein, said elongated member comprising a substantially flat member including two openings therein and a turned-down portion at one end thereof, one of said openings being so dimensioned as to be slidably engageable in said channels, said turned-down portion including a threaded hole therein, said one of said housing portions including an aperture therein disposed adjacent said threaded hole, and a threaded screw disposed in said aperture and in engagement with said threaded hole for moving said elongated member, the other of said housing portions including means affixed interiorly thereof and so engageable with said opening in said elongated member that movement of said elongated member in one direction retains said housing portions in said predetermined relation to one another, and the movement of said elongated member in an opposite direction releases said housing portions from said predetermined relation.

5. In a photoflash unit adapted to be mounted on a hand-held camera, in combination: a capacitor, an incandescent lamp, a resistor, a removably mounted battery, and means adapted to connect said capacitor, said lamp, said resistor, and said battery in series circuit relationship when said photoflash unit is mounted on said camera whereby said capacitor may be charged, the last named means including a movable resilient electrical conducting member having one end engaging one terminal of said battery biased to move to a first position whenever said battery is removed from said unit and movable to a second position and held in said second position by engagement with said battery terminal whenever said battery is mounted in said unit, one end of said resistor being connected to the other end of said resilient electrical conducting member and the other end of said resistor being connected to one terminal of said capacitor, said resilient member forming a part of said series circuit when in said second position, said resilient member opening said series circuit when moving to said first position, said resilient member when in said first position contacting the other terminal of said capacitor and establishing a discharging circuit for said capacitor by connecting said resistor in shunt with said capacitor.

6. The invention defined by claim 5 wherein said capacitor has said other terminal in the form of a conducting metallic cylindrical cover, and said resilient member contacts said capacitor cover when in said first position.

References Cited in the file of this patent

UNITED STATES PATENTS

| | | |
|---|---|---|
| 1,253,848 | McKeever | Jan. 15, 1918 |
| 1,918,347 | Mitchell | July 18, 1933 |
| 1,957,080 | Roth | May 1, 1934 |
| 2,320,446 | Peterson | June 1, 1943 |
| 2,423,664 | Ryder | July 8, 1947 |
| 2,602,135 | Nordquist | July 1, 1952 |
| 2,812,420 | Bing | Nov. 5, 1957 |
| 2,825,795 | Henninger | Mar. 4, 1958 |
| 2,832,206 | Baermann | Apr. 29, 1958 |
| 2,863,988 | Schwartz | Dec. 9, 1958 |
| 2,983,810 | James et al. | May 9, 1961 |

FOREIGN PATENTS

| | | |
|---|---|---|
| 696,468 | Great Britain | Sept. 2, 1953 |